United States Patent Office 3,338,618
Patented Aug. 29, 1967

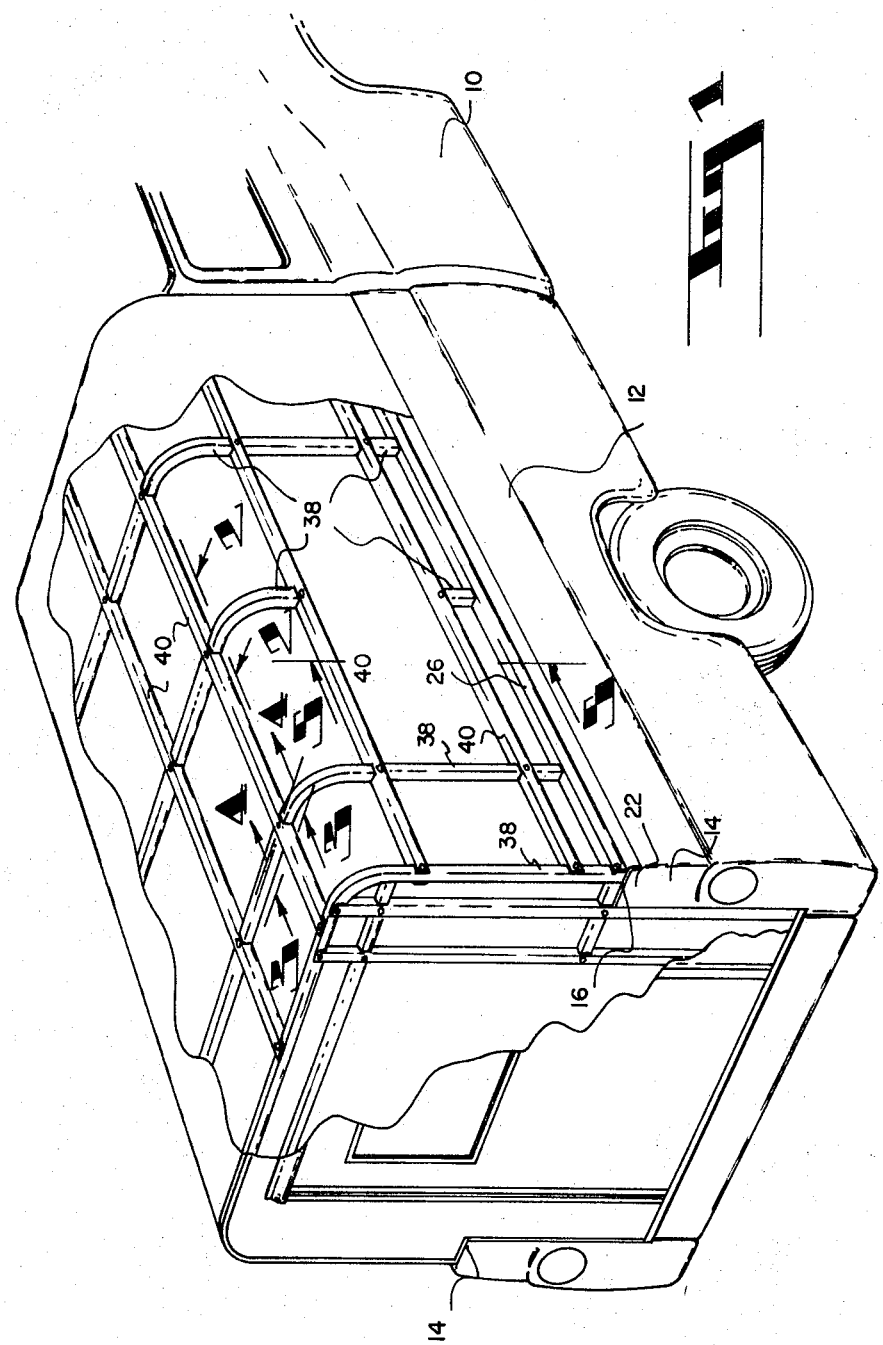

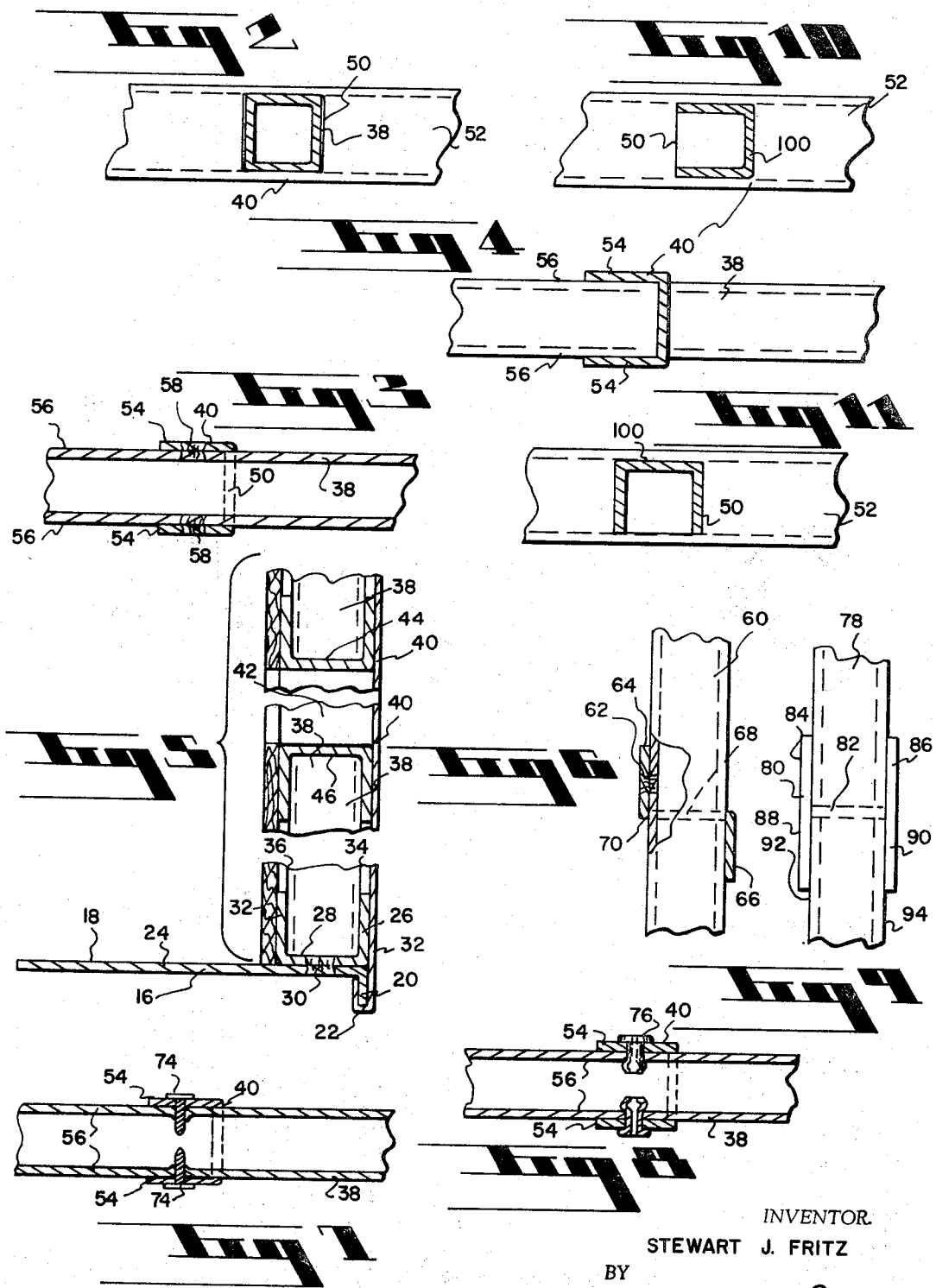

3,338,618
ENCLOSURE FRAME STRUCTURE
Stewart J. Fritz, 6935 E. Wilshire,
Scottsdale, Ariz. 85257
Filed June 17, 1965, Ser. No. 464,629
2 Claims. (Cl. 296—23)

ABSTRACT OF THE DISCLOSURE

A truck shell camper adapted to reset on opposite upper edges of a conventional box-shaped pickup truck bed comprising laced intersecting frame members extending longitudinally and laterally, the laterally extending members being rectangular in cross-section tubular members laced through web sections of longitudinally disposed channeled-shaped in cross-section members; opposite downwardly extending ends of the tubular members being supported on L-shaped base frame members which rest on upper edge portions of the box-shaped pickup truck bed.

---

This invention relates to an enclosure frame structure, and more particularly to an enclosure frame structure which is adapted for use in truck camper structures to partially enclose the conventional open beds of pickup trucks, or the like.

In the construction of truck camper enclosures, it has been a problem to build strong structural framework, due to the necessity of assembling and welding the frame members of such structures, all of which requires a substantial amount of parts cutting, jig work and welding. These truck camper frames are usually butt-welded at the intersections of the vertical and/or horizontal members and are generally covered on the outside with sheet metal, such as aluminum, and are lined on the inside with plywood or other suitable material.

There are many different models and sizes of these truck campers in production to fit various makes and models of pickup trucks which vary in longitudinal body length, as well as body width, and various requirements impose variations in elevation of such truck campers, in many instances, as required by the customer.

Accordingly, conventional methods and structures now employed in the production of these truck campers imposes considerable labor costs. Most conventional steel frame structures, at their intersections, are butt-welded by welding and are relatively expensive due to the time required in assembling and jigging these parts together so that they are assembled in an accurate manner.

Accordingly, it is an object of the present invention to provide an enclosure frame structure particularly adapted to the production of truck campers, wherein the intersecting frame members are laced through each other to form a substantial means for jigging the parts together before welding and to provide for very simple rapid spot welding or fixing of the frame members together at their intersections.

Another object of the invention is to provide an enclosure frame structure which requires a minimum of labor in the preliminary assembly thereof, and in the fixing of the frame members together at their intersections.

Another object of the invention is to provide an enclosure frame structure wherein laced intersecting members are connected at each intersection thereof, by the projection of one member through an opening in the other member, and the other member having flanges contiguous to opposite sides of the member projected thereto, so that the flanges may be welded or otherwise secured to the member projected through the opening and thereby, not only form a locating and jigging facility, but also a continuity of structure of both members extending throughout the intersection thereof.

Another object of the invention is to provide an enclosure frame structure which is particularly adapted for building truck shell campers.

Another object of the invention is to provide an enclosure frame structure which promotes accuracy in the assembly and welding of truck camper frames.

Another object of the invention is to provide an enclosure frame structure which is very strong in proportion to its bulk and weight.

Further objects and advantages of the invention may be apparent from the following specification, appended claims, and accompanying drawings, in which:

FIG. 1 is a perspective view of an enclosure frame structure, according to the present invention, and forming part of a truck shell camper mounted on a truck pickup body structure, and showing portions of the outer skin structure of the truck shell camper broken away to expose the enclosure frame structure of the invention;

FIG. 2 is an enlarged fragmentary sectional view taken from the line 2—2 of FIG. 1;

FIG. 3 is an enlarged fragmentary sectional view taken from the line 3—3 of FIG. 1;

FIG. 4 is an enlarged framgentary sectional view taken from the line 4—4 of FIG. 1;

FIG. 5 is an enlarged fragmentary sectional view taken from the line 5—5 of FIG. 1;

FIG. 6 is a fragmentary sectional view of a modified form of intersecting members of the enclosure frame structure, in accordance with the present invention;

FIG. 7 is another view similar to FIG. 6 showing a further modification of a means for fixing together intersecting members of the enclosure frame structure of the invention;

FIG. 8 is another similar view to FIGS. 6 and 7 and showing a further modified means for securing the intersecting members of the enclosure frame structure of the invention together;

FIG. 9 is another view similar to FIG. 6 and showing a varying cross-sectional shape of one of the intersecting members of the enclosure frame structure of the invention;

FIG. 10 is a sectional view of a modified structure taken on the same plane as FIG. 2; and FIG. 11 is a sectional view showing a further modified structure and taken on the same plane as FIG. 2.

As shown in FIG. 1 of the drawings, a conventional pickup truck 10 is provided with a substantially conventional open pickup bed 12 which is substantially box-shaped and provided with upper side edge portions 14, on which base members 16 of the invention support a truck shell camper enclosure frame structure of the invention. This base member structure 16, being shown in FIGS. 1 and 5 of the drawings. This base member 16 is substantially L-shaped in cross-section having a horizontal portion 18 and a vertical portion 20, which is directed downwardly and terminates in a lower edge 22 which extends downwardly over the outer side of the truck pickup bed 12 and below the upper side edge 14 thereof.

Secured on an upper surface 24 of each respective base member 16 is an upright channel 26 having a middle web portion 28 welded at 30 to the horizontal portion 18 of the base member 16. The upright channel 26 is provided with flanges or leg portions 32, which are integral with the web 28. These flanges 32 support opposite sides 34 and 36 of upright structural members 38.

As shown in FIGS. 1 and 5 of the drawings, horizontal members 40 intersect the vertical members 38 and some of the vertical members 38 are interrupted by horizontal members in the sides of the camper to form window openings, there being a short section of an intermediate member 38 cut away, as illustrated particularly in FIG. 5 of the drawings. With reference to FIG. 5, it will be seen that the horizontal members 40, spaced apart vertically in the sides of the frame, provide for a window opening 42 and that an intermediate member of the vertical members 38 is provided with terminal portions 44 and 46 held between the flanges of respective horizontal U-shaped in cross-section channel members 40, one of which is upright and the other inverted.

The upright members 38 are curved at the upper corners of the frame and extend horizontally over the top portion thereof. The upright members 38, at their intersections with the horizontal members, extend through openings in the webs of the horizontal members.

With reference to FIGS. 2, 3 and 4 of the drawings and to the section lines on FIG. 1 from which they are taken, it will be seen that the particular horizontal members 40 are generally channel-shaped in cross-section similar to the upright channel 26, hereinbefore described.

In general, the members 38 are of rectangular in cross-section tubular structure, as indicated best in FIG. 2 of the drawings. In general, the members 38 and 40 are intersecting members which are laced together, since the members 38 are extended through openings 50 in web structures 52 of the intersecting members 40; each intersecting member 40 having a pair of flanges 54 which are contiguous with opposite sides 56 of respective intersecting members 38, such that a weldment, as shown in FIG. 4 of the drawings and designated 58, may secure respective flanges 54 and opposite sides 56 of the intersecting members 40 and 38, respectively.

It will be noted that the openings 50 in the webs 52 of the intersecting members 40 are slightly greater in cross-section than the cross-sectional dimensions of the intersecting members 38 permitting the members 40 slidably to be laced on or positioned over the members 38 and into position to be welded to provide the spot welds 58, as may be accomplished by conventional inert gas shielded arc or spot welding equipment.

It will be appreciated by those skilled in the art that the lacing together of the frame members at their intersections and the fact that the flanges 54 of the intersecting members 40 form a continuity across the intersection and also the openings 50 provide for precise spacing of the members 38, when assembled with the members 40, all saves labor and holds the parts in position to be welded together. This saves considerable time as compared to a conventional method of cutting short sections to go between the intersecting members and to butt-weld such short sections in the overall frame structure. Further, it will be appreciated by those skilled in the art that the present construction of the flanges 54 being continuous with opposite sides 56 of the respective intersecting members, as shown in FIG. 4, promotes the facility of rapid spot welding to secure the intersecting members together at each intersection thereof.

With this construction, it is only necessary to take a rectangular plate or jig structure and place it in a window opening in the side of the frame, as hereinbefore described, to square up the interlaced assembly of frame members whereupon welding may proceed.

In the modification shown in FIG. 6 of the drawings, an intersecting member 60 is similar to the hereinbefore described intersecting member 38. A modified intersecting member 62 is similar to the intersecting members 40, but comprises a pair of flanges 64 and 66, which are directed in opposite directions as compared to the flanges 54 which are directed in the same direction. This intersecting member 62 is provided with a central web 68 having an opening 70 therethrough in which the intersecting member 60 is disposed.

With reference to FIG. 7 of the drawings, it will be obvious that structures similar to that disclosed in FIG. 4 may be secured together by conventional self tapping sheet metal screws 74 which extend through the flanges 54 of the intersecting member 40 and through corresponding walls 56 of the respective intersecting member 38. Likewise, as shown in FIG. 8 of the drawings, upset rivets 76 extend through the flanges 54 and the walls 56 of the respective intersecting members 40 and 38.

In the modification, as shown in FIG. 9 of the drawings, an intersecting member 78 is similar to the intersecting member 60 and the intersecting member 38. Another modified intersecting member 80 is generally H-shaped and provided with a central web 82. This section 80 has flanges 84 and 86 extending in one direction from the web 82 and, also, flanges 88 and 90 extending in an opposite direction from the web 82.

The web 82 is provided with an opening therein through which the intersecting member 78 extends.

The advantage of this structure is that several welds may be made at the intersections, particularly through the oppositely extending flanges 84 and 86 and 88 and 90 and respective areas at opposite sides 92 and 94 of the intersecting member 78.

As shown in FIG. 10 of the drawings, the structural intersecting member 52 similar to that shown in FIG. 2, is provided with a similar opening 50 through which a channel-shaped in cross-section member 100 is disposed. Thus, the channel-shaped in cross-section intersecting member 100 extends through the opening 50 in the channel-shaped in cross-section member 52, this differing from the structure shown in FIG. 2, in that the channel 100 is used in lieu of the tubular in cross-section member 38.

As shown in FIG. 11, the structure is taken on the same plane as FIGS. 2 and 10 and the channel 100 is shown rotated substantially ninety degrees.

It will be obvious to those skilled in the art that channel sections may be projected through the intersecting members 62 and 80 as an alternate to the rectangular in cross-sectional shaped tubular members hereinbefore described.

It will be obvious to those skilled in the art that the laced intersecting members of the present invention provide for precision assembly, jigging and holding of the intersecting members together during welding and that the continuity of both of the intersecting members, beyond and through each intersection thereof, provides for strength, as well as simplicity of welding of the flanges of one intersecting member at opposite sides of another intersecting member which extends through an opening in the web of the intersecting member integral with the flanges.

Additionally, it will be obvious to those skilled in the art that various modifications of the present invention may be resorted to in a manner limited only by a just interpretation of the following claims.

I claim:

1. In a shell camper structure for pickup trucks, the combination of: a frame having first and second laced intersecting members, said structure having forward and rearward ends, opposite sides, and a top portion; elongated based frame members disposed forwardly and rearwardly and supporting said opposite sides; some of said first intersecting members being substantially of an inverted U-shaped form, and provided with opposite downwardly extending ends supported on said base frame members; some of said first intersecting members extending upwardly from one of said base frame members, up one side of said structure, over the top portion thereof from side to side, and down the opposite side of said structure; said first intersecting members being rectangular in cross-section tubular members; said second intersecting members extending forwardly and rearwardly substantially parallel to said base frame members; said second intersecting members being of a cross-sectional shape comprising an intermediate web with a pair of spaced integral flanges extending substantially at right angles from said web; said web of each of said second intersecting members having openings in which said first and second members extend; said flanges contiguous with and fixed to opposite sides of said first intersecting members; a plurality of said first intersecting members spaced apart in a forward and rearward direction; and a plurality of said second intersecting members spaced apart laterally at the sides and top of said structure, said base frame members adapted to rest on an upper edge of a box shaped pickup truck bed.

2. The invention, as defined in claim 1, wherein: said base frame members being L-shaped in cross-section and having one horizontal leg adapted to rest on said upper edge structure of a box-shaped pickup truck bed; each of said base frame members having a vertical leg extending downwardly from said horizontal leg, said vertical leg disposed and adapted to extend downwardly at an outer side of said pickup truck body below said upper edge structure thereof, said vertical legs of said base frame members at opposite sides of said shell camper structure opposed to each other to afford lateral support thereof on said pickup truck bed.

References Cited
UNITED STATES PATENTS

| | | | |
|---|---|---|---|
| 2,173,076 | 9/1939 | Stetson | 296—23 |
| 3,215,465 | 11/1965 | Garrison | 296—23 |
| 3,282,603 | 11/1966 | Barth | 52—667 X |

BENJAMIN HERSH, *Primary Examiner.*

P. GOODMAN, *Assistant Examiner.*